Dec. 5, 1961 A. J. VAKSVIK 3,012,213
TANDEM CONTROL FOR STEREOPHONIC SOUND
REPRODUCING SYSTEMS
Filed May 27, 1960 3 Sheets-Sheet 2
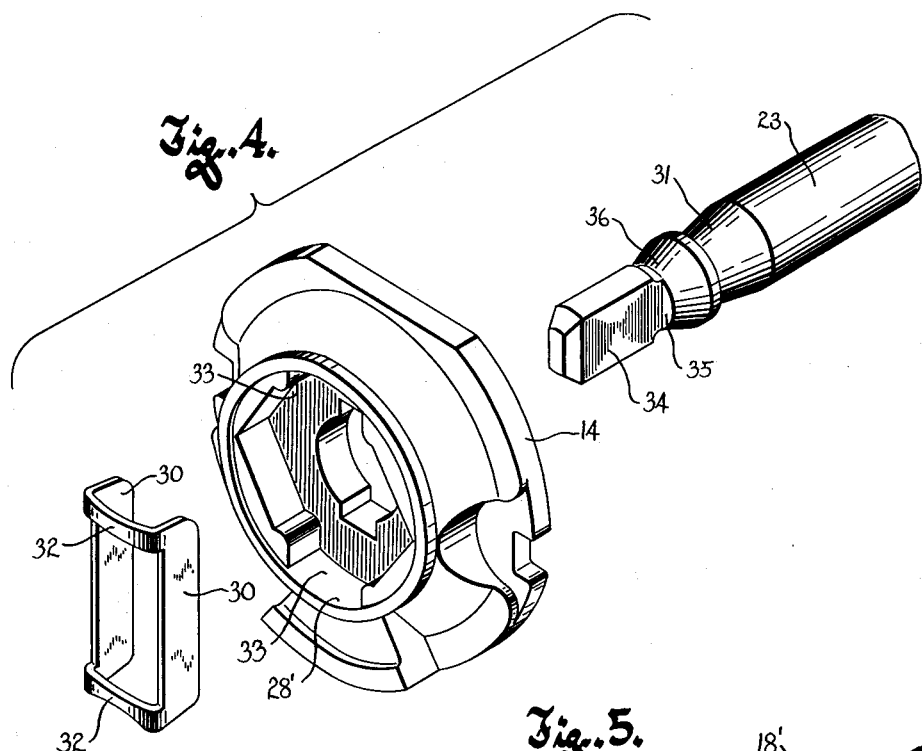
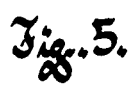
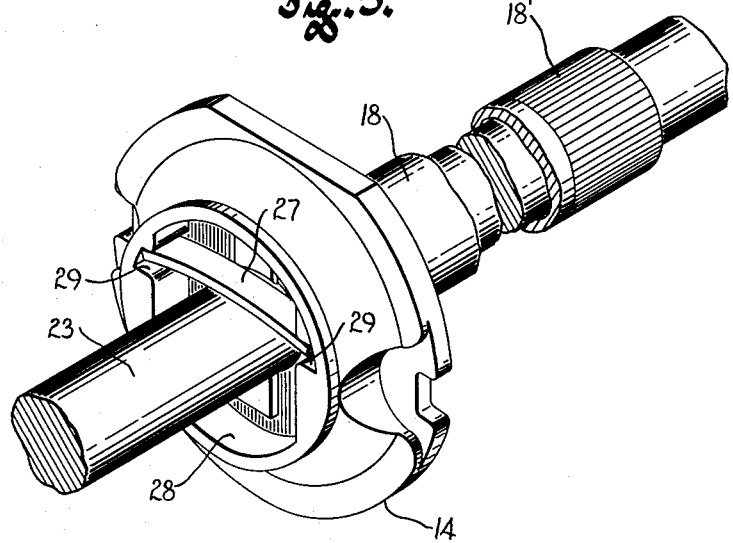
INVENTOR
Adrian J. Vaksvik
BY Ira Milton Jones
Attorney

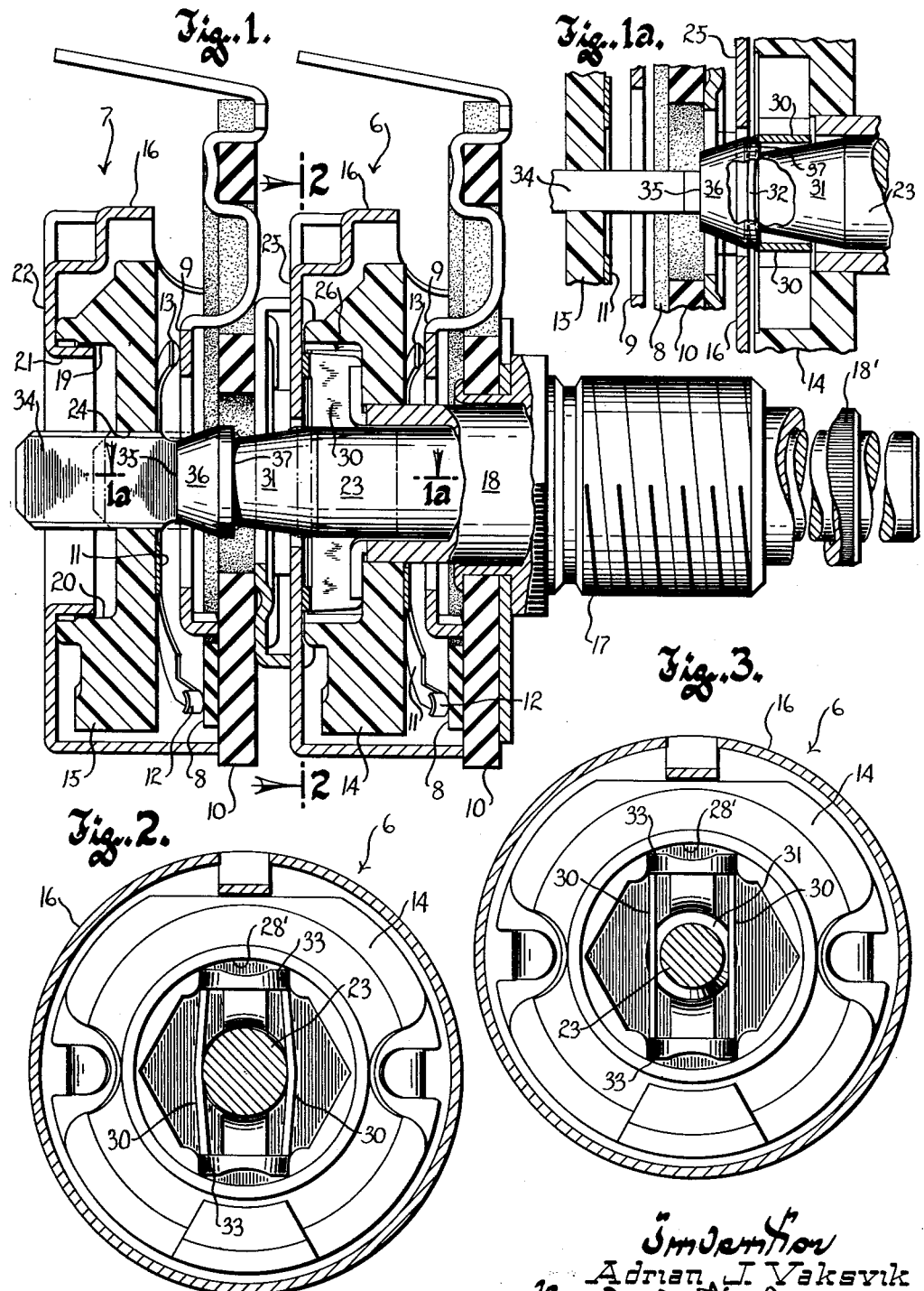

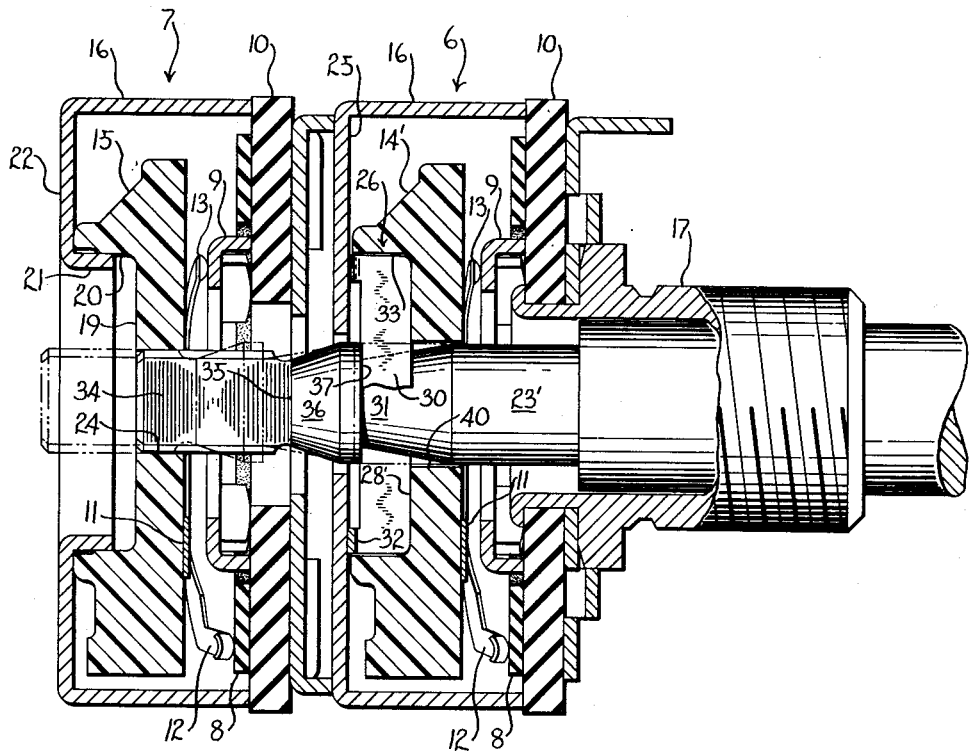

United States Patent Office 3,012,213
Patented Dec. 5, 1961

3,012,213
TANDEM CONTROL FOR STEREOPHONIC SOUND REPRODUCING SYSTEMS
Adrian J. Vaksvik, Elkhart, Ind., assignor to CTS Corporation, Elkhart, Ind., a corporation of Indiana
Filed May 27, 1960, Ser. No. 32,354
2 Claims. (Cl. 338—134)

This invention relates to controls for sound reproducing equipment, and refers more particularly to a control especially adapted for use with stereophonic reproducing sound systems.

Stereophonic sound reproducing systems and some radio and television receivers with audio systems utilizing the stereophonic principles, have two or more separate amplifier-speaker systems or channels. Naturally, it is desirable that each channel be equipped with its own control by which the level of its output may be independently adjusted, but after these separate control units have been independently adjusted and the outputs of the two or more channels have been properly matched, it is thereafter desirable to be able to concomitantly adjust the controls in order that identical variations may be made in different channels.

It is the general purpose of this invention to provide a tandem volume control by which this desired objective may be attained and, hence, to provide a control especially adapted for sound reproducing systems utilizing the stereophonic principle.

More specifically, it is an object of this invention to provide a tandem variable resistor volume control in which the rotors are connected to normally turn in unison, but are nevertheless capable of independent adjustment.

In this connection, and still more specifically, it is a purpose of this invention to provide a tandem control of the character described, wherein the rotors of the two units are normally frictionally coupled to turn in unison, but in which the friction clutch is so designed that it may be disabled or overcome at will to allow independent adjustment of at least one of the two units.

Another object of this invention is to provide an improved and simple manner of quickly and easily disabling of the friction clutch which normally drivingly connects the rotors of the two units, and wherein such disabling of the friction clutch is effected by endwise shifting the actuating shaft of one of the units.

The invention has another advantageous feature which, though having no relationship to the friction clutch between the two rotors, is derived as a consequence of the way in which the friction clutch is constructed in the preferred embodiment of the invention. In tandem connected variable resistors the grounding of the actuating shaft of the rear unit has often presented a problem. Although this shaft turns inside the well grounded hollow actuating shaft of the front unit and therefore should also be grounded, the possibility exists that the shaft may be momentarily insulated from one another by lubricant therebetween. To guard against this possibility the present invention provides a positive ground for the rear or inner actuating shaft, and does so by utilizing the friction clutch in a novel way. The friction clutch thus performs a dual function.

Still another point should be made. As will be seen, by this invention, a few simple structural changes in existing standard piece parts and the addition of one small inexpensive easily fabricated part, has adapted the conventional tandem variable resistor to the special requirements of a volume control for stereophonic sound reproducing systems.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate three complete examples of the physical embodiments of the invention constructed according to the best modes so far devised for the practical application of the principles thereof, and in which:

FIGURE 1 is a longitudinal sectional view through a tandem variable resistor control embodying this invention, the friction clutch being engaged in this view;

FIGURE 1a is a fragmentary sectional view through FIGURE 1 substantially on the plane of the line 1a—1a, but with the friction clutch shown disengaged;

FIGURE 2 is a cross sectional view through FIGURE 1 on the plane of the line 2—2, illustrating the friction clutch in its engaged condition;

FIGURE 3 is a view similar to FIGURE 2 but illustrating the friction clutch disengaged;

FIGURE 4 is an exploded perspective view of the essential parts of the friction clutch by which the rotors of the two units are normally connected for rotation in unison;

FIGURE 5 is a perspective view of the essential elements of a friction clutch suitable for the purposes of this invention, but of modified form and construction; and FIGURE 6 is a longitudinal sectional view through a tandem variable resistor control embodying this invention in a manner which obviates the tubular shaft with which the front unit is customarily equipped.

Referring particularly to the accompanying drawings, the numerals 6 and 7 indicate generally the front and rear units, respectively, of a tandem connected variable resistor control embodying this invention. Each of the units 6 and 7 has an arcuate resistance element 8 and a collector ring 9 mounted on the back of a base 10 of insulating material, and a bridging contactor 11 with resilient contact fingers 12 and 13 bearing upon the resistance element and collector ring, respectively. The contactor of the front unit is carried by a driver 14 and the contactor of the rear unit is carried by a driver 15. In each instance, the driver is preferably a disc-like molding of insulating material, and in each case the driver, with its bridging contactor mounted thereon, constitutes the rotor of the variable resistor unit.

The resistance element and collector ring are equipped with the customary terminals, and a cup-shaped metal cover 16 fixed over the rear of each base coacts therewith to enclose or house the instrumentalities of the resistor. It is to be noted that the covers 16 are grounded. This is especially important in the case of the cover of the front unit which is grounded to the mounting bushing 17 by which the entire control is secured to the chassis in which it is assembled in use.

The mounting bushing 17, as is customary, is secured to the base 10 of the front unit and in that form of the invention illustrated in FIGURES 1–5, has a hollow actuating shaft 18 for the rotor of the front unit journalled therein. Since the molded driver 14 is fixed to the hollow shaft 18, its reception in the mounting bushing 17 provides the needed journal for the rotor of the front unit.

The rotor of the rear unit is differently supported for rotation. Its molded driver 15 has a rearwardly opening socket 19 with a circular side wall 20 journalled upon a cylindrical flange 21 extruded from the rear wall 22 of the cover 16 and projecting forwardly therefrom. The rear edge of the circular side wall 20 bears against and rides upon the rear wall 22 to support the rear rotor against the rearward axial thrust imposed thereon by the resilient fingers 12 and 13 of its bridging contactor.

To rotatably adjust the rotor of the rear unit, an inner shaft 23 is provided. This shaft is received in the hollow actuating shaft 18 of the front unit and extends entirely through the front unit, passing through a hole in the rear wall 25 of its cover and through a hole in the base 10 of the rear unit. Its rear end has a slidably splined driving connection 24 with the molded driver 15, and its front end projects beyond the front end of the hollow shaft to mount a control knob (not shown).

Except for the slidably splined driving connection between the inner shaft and the rotor of the rear unit, the structure thus far described is substantially conventional. The reason for the slidably splined driving connection will be pointed out presently.

Since the purpose of this invention is to provide a tandem variable resistor control particularly adapted to the special requirements of stereophonic sound reproducing systems, a friction clutch indicated generally by the numeral 26, is provided to normally connect the rotors of the front and rear units for rotation in unison. Essentially, this friction clutch comprises one or more spring blades carried by the rotor of the front unit and frictionally engaging the side of the actuating shaft 23 of the rear unit.

In its simplest embodiment, the friction clutch 26 is as shown in FIGURE 5. In this form of the invention, it consists of a single spring blade 27 seated in a rearwardly opening socket 28 in the molded driver 14, with the ends of the blade received in pockets 29 formed in the side wall of the socket 28. These pockets are so located that when the blade 27 is in place therein, its medial portion must be bowed to accommodate the shaft 23. Hence, the blade 27 is under tension and bears against the side of the shaft 23 with a firm frictional engagement.

The friction clutch of this simple embodiment of the invention (FIGURE 5) is at all times engaged, so that normally torque applied to either shaft will result in the rotors of both units being adjusted. Independent adjustment of the rotors of the front and rear units may be accomplished by restraining one of the shafts against rotation while the other is turned against the opposing force of the friction clutch. To facilitate such independent adjustment, the outer hollow shaft 18 has its front end knurled, as at 18′, it being understood that the inner shaft 23 has a knob (not shown) fixed to it. Obviously, once the two units are thus independently adjusted to achieve the desired balance between the channels they control, both may be simultaneously adjusted by the knob (not shown) fixed to the shaft 23.

The friction clutch in the embodiment of the invention illustrated in FIGURES 1-4, inclusive, may be left engaged at all times and forcibly overcome when independent adjustment of the separate rotors is required, as in the structure shown in FIGURE 5; but for added convenience means are provided in this embodiment of the invention to disengage the friction clutch and thus free the rotors of the two units for easier independent adjustment. In addition, this embodiment of the invention provides a positive ground for the inner shaft 23. To attain these features, the friction clutch in this case consists of two blades 30— one at each side of the shaft 23, the shaft 23 being gripped between these two blades when the clutch is engaged, as shown in FIGURE 2.

Disengagement of the friction clutch is effected by shifting the shaft 23 to align a reduced diameter portion 31 thereof with the blades 30. This allows the blades to assume their normal untensioned flat state and completely frees the shaft therefrom, as illustrated in FIGURES 1a and 3.

The spring blades 30 are integral parts of a unitary stamping (best shown in FIGURE 4) being connected at their opposite ends by cross bars 32. The cross bars 32 are slightly convex and, in the assembled condition of the parts, bear upon the inner face of the rear wall 25 of the metal cover 16 for the front unit to positively ground the shaft 23 to the cover 16.

To achieve the described positional relationship, the spring unit consisting of the blades 30 and the cross bars 32, is received in and extends diametrically across the rearwardly opening socket 28′ in the molded driver 14, with the ends of the spring unit snugly received in notches or pockets 33 in the side wall of the socket 28′ and the front edges of the blades seated upon the bottom of the socket. Since the depth of this socket is slightly less than the distance between the highest point on the convex cross bars 32 and a plane connecting the front edges of the spring blades, the cross bars 32 project a slight distance beyond the rear edge of the socket to be pressed against the rear wall 25 by the rearward thrust imposed upon the rotor of the front unit by the spring blades of its bridging contactor.

As will be readily apparent, the engagement between the bowed cross bars 32 with the rear wall 25 theoretically is little more than a line contact and, hence, offers minimum opposition to rotary adjustment of the rotor of the front unit.

Attention is directed to the fact that the slidably splined driving connection 24 between the inner or rear end of the shaft 23 and the driver 15 of the rear unit, consists of a flattened or slabbed-off rear end portion 34 on the shaft slidably received in a correspondingly shaped non-circular hole in the driver 15. The abrupt shoulder 35 formed at the junction of the flattened or slabbed-off portion 34 with the rest of the shaft, is engageable with the front face of the driver 14, to define the rearmost limit of endwise movement for the shaft 23.

In assembling the control, the shaft 23 may be inserted as the final operation and, to enable the shaft to pass through the spring blade unit, its portion 36 directly forwardly of the shoulder 35 is tapered or conical, as shown. For the same reason, the reduced diameter portion 31 is conical in shape.

After the shaft 23 has been inserted, it is held against forward removal by the engagement of the abrupt shoulder 37 formed by the inner end of the reduced diameter portion of the shaft with the rear edges of the spring blades 30, as shown in FIGURE 1a.

As in the more simplified embodiment of the invention (FIGURE 6) only a single operating knob need be provided, and this is preferably mounted on the exposed front end of the inner shaft 23. As long as the friction clutch is engaged, i.e. as long as the inner shaft is at its rearmost limit of permitted endwise movement with respect to the hollow outer shaft (shown in full lines in FIGURE 1), torque applied to the inner shaft will turn the rotors of both front and rear units; but, upon shifting the inner shaft 23 forwardly (to its dotted line position shown in FIGURE 1), its reduced diameter portion 31 is brought into alignment with the spring blades 30 and, as a result, the clutch is disengaged. In this condition either shaft may be freely turned without hindrance from the other, and to facilitate turning the hollow outer shaft, its front end is preferably knurled as at 18′, or, if desired, it could be provided with a second knob.

While it is ordinarily desirable to provide for independent adjustment of either unit, the advantages of the invention can be realized even if the control has but a single shaft, as shown in FIGURE 6. In this case, relative adjustment between the two units is made by simply disengaging the clutch and then turning the rotor of the rear unit by means of its shaft 23′, while the rotor of the front unit which has no shaft, is left undisturbed. Obviously, for this arrangement to function properly, the shaft 23′ must be free to turn in the rotor of the front unit when the shaft is pulled out to disengage the clutch.

Accordingly, the driver 14′ of the front unit has a smooth central bore 40 of a size to freely rotatably and slidably receive the shaft 23′. This enables the rotor of the front unit to receive guidance from and be centered by the shaft when both rotors are simultaneously turned (which, of course, requires that the clutch be engaged) while leaving the front rotor unaffected during independent adjustment of the rear rotor after the clutch is disengaged.

Also, to receive proper guidance and support from the mounting bushing 17, the shaft 23' has its outer end portion increased in diameter to fit the bore of the bushing, as shown.

From the foregoing description taken in connection with the accompanying drawings, it will be readily apparent to those skilled in this art, that this invention provides a tandem variable resistor control especially adapted to the requirements of stereophonic sound reproducing systems, and that it achieves its purpose in an extremely simple manner without requiring costly changes in existing well accepted structural design, and that, in addition, it provides a positive ground for the shaft of the rear unit and thereby eliminates a difficulty heretofore often encountered in tandem connected variable resistors.

What is claimed as my invention is:

1. A tandem control for stereophonic sound reproducing systems, comprising the combination of: a pair of front and rear tandem-connected variable resistor units, each having a rotor by which the effective resistance value of the unit may be adjusted, the rotor of the front unit having a hole through its center and including a disc-like driver having an open rearwardly facing socket at its center; a shaft drivingly connected to the rotor of the rear unit, and passing freely through the hole in the rotor of the front unit with the front end portion of the shaft exposed for manual manipulation; and a friction clutch normally drivingly connecting the two rotors for rotation in unison, said friction clutch comprising a unitary sheet metal stamping having a pair of normally flat parallel spring blades embracing the shaft and extending transversely thereof, and cross bars integral with the end portions of said blades to connect the same and hold them spaced apart a distance slightly less than the diameter of the shaft, so that said blades must be resiliently sprung apart to embrace the shaft, and means forming pockets in the side wall of said rearwardly facing socket in which the end portions of said blades are received to constrain the unitary stamping to turn with the disc-like driver of the front unit and keep the ends of the spring blades from being spread apart.

2. The control unit of claim 1, wherein the front unit includes a metal cover having a wall substantially normal to the axis of the unit and to the rear of the disc-like driver; and wherein the unitary stamping has the front edges of its spring blades seated upon the bottom of the rearwardly opening socket in the disc-like driver, and its cross bars projecting beyond the rear of the driver and bearing upon said wall of the cover to electrically ground the shaft gripped between the blades to said wall.

References Cited in the file of this patent
UNITED STATES PATENTS

| | | |
|---|---|---|
| 1,231,341 | Dufour | June 26, 1917 |
| 1,633,910 | Showalter et al. | June 28, 1927 |
| 2,916,617 | Mladek | Dec. 8, 1959 |
| 2,927,168 | Brown | Mar. 1, 1960 |